United States Patent
Boisvert

[11] Patent Number: 5,983,684
[45] Date of Patent: Nov. 16, 1999

[54] ANTI-THEFT DEVICE

[76] Inventor: Richard M. Boisvert, 17 Smyth Crescent, Beeton, Ontario, Canada, L0G 1A0

[21] Appl. No.: 09/010,751

[22] Filed: Jan. 22, 1998

[51] Int. Cl.⁶ .............................. F16B 41/00; E05B 73/00
[52] U.S. Cl. ..................................... 70/232; 70/14; 70/57; 70/164
[58] Field of Search .................................... 70/14, 18, 19, 70/56, 227, 226, 232, 57, 58, 180, 163–165

[56] References Cited

U.S. PATENT DOCUMENTS

| | | |
|---|---|---|
| D. 336,603 | 6/1993 | Penaflor . |
| 1,594,586 | 8/1926 | Anderson ....................................... 70/18 |
| 2,169,860 | 8/1939 | Von Hoorn ................................. 70/203 |
| 3,190,090 | 6/1965 | Zaidener ..................................... 70/203 |
| 3,678,717 | 7/1972 | Eaton ........................................ 70/232 |
| 3,754,420 | 8/1973 | Oellerich ..................................... 70/58 |
| 3,884,055 | 5/1975 | Vuillemot ..................................... 70/58 |
| 4,360,074 | 11/1982 | Parquet ..................................... 180/287 |
| 4,407,146 | 10/1983 | Nielsen, Jr. ................................. 70/18 |
| 4,419,872 | 12/1983 | Plifka ........................................ 70/57 |
| 4,473,176 | 9/1984 | Harper ........................................ 70/58 |
| 5,138,852 | 8/1992 | Corcoran ..................................... 70/16 |
| 5,794,462 | 8/1998 | Steele et al. ................................ 70/56 |
| 5,826,448 | 10/1998 | Graham ........................................ 70/18 |

FOREIGN PATENT DOCUMENTS 3202699  8/1983  Germany .................................... 70/57

*Primary Examiner*—Darnell M. Boucher

[57] ABSTRACT

A new anti-theft device for locking a telescopic fluidic piston-cylinder actuator in an extended piston position. The inventive device includes an elongate strut wall member having an arcuate wall portion with a pair of side wall portions. The side wall portions are spaced apart to define an elongate channel extending between the first and second ends of the strut wall member. The channel is designed for receiving the extended piston portion of a piston-cylinder actuator therein. Each side wall portion has an aperture extending through each of them. The distal end of an elongate locking pin is insertable through the apertures of the side wall portions such that the locking pin is extendible between the side wall portions across the channel of the strut wall member. The locking pin has a locking bore positioned towards its distal end for extending a shank portion of a lock therethrough to hold the extended piston portion of a piston-cylinder actuator within the channel when the locking pin is extended through the apertures of the side wall portions. One end of an elongate flexible member is coupled to one of the side wall portions while the other end of the flexible member is coupled to the proximal end of the locking pin.

8 Claims, 2 Drawing Sheets

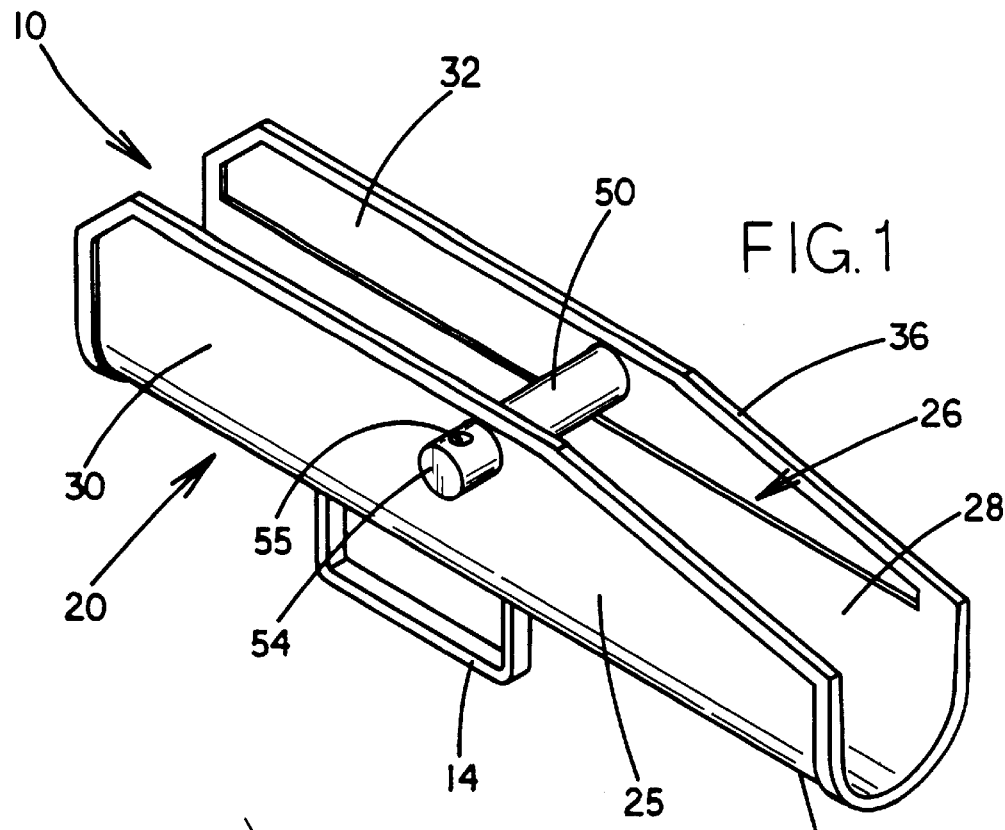
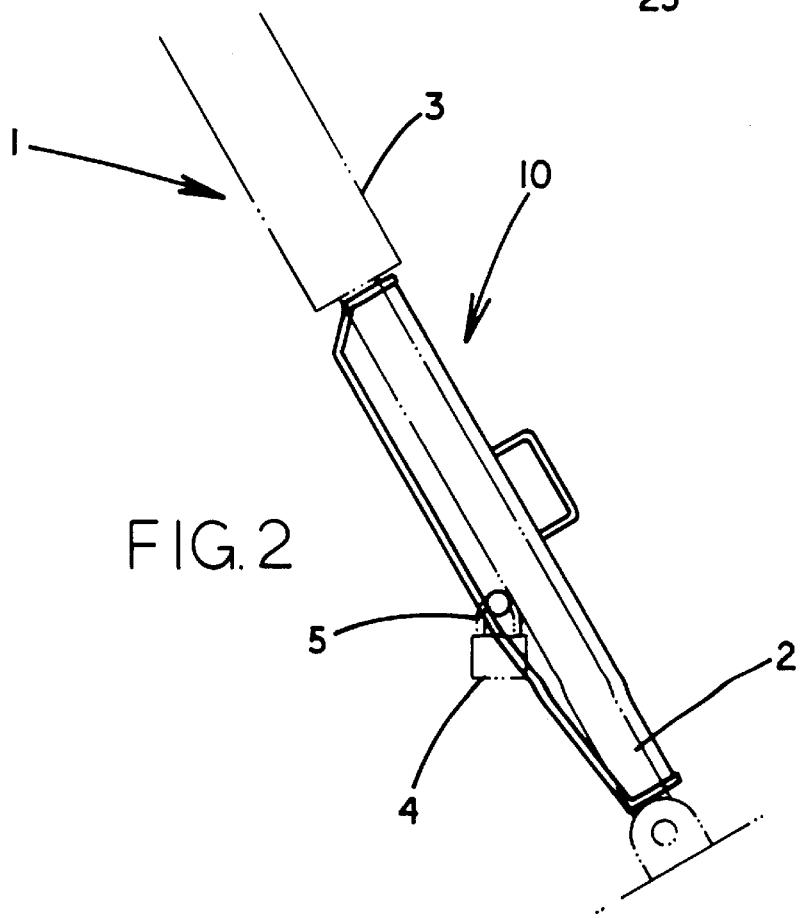

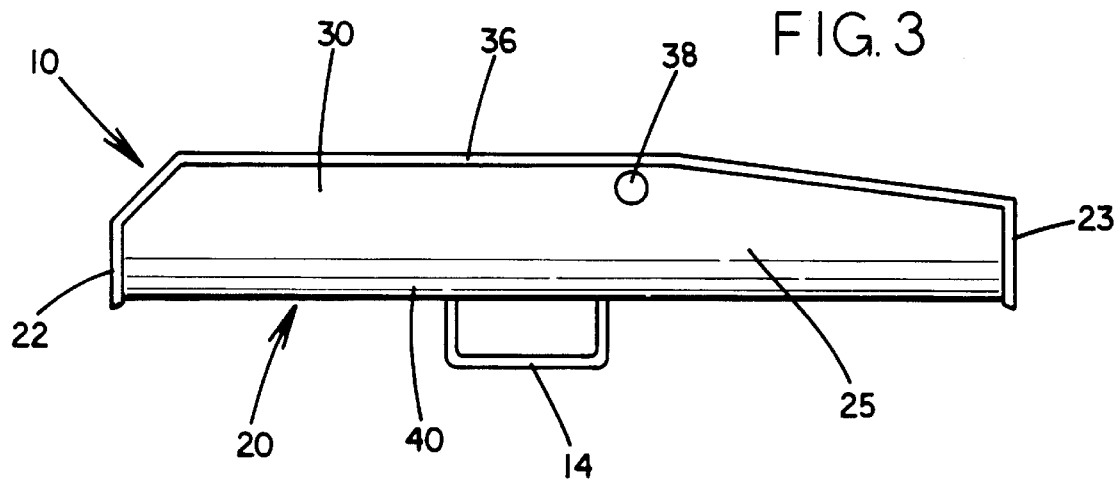
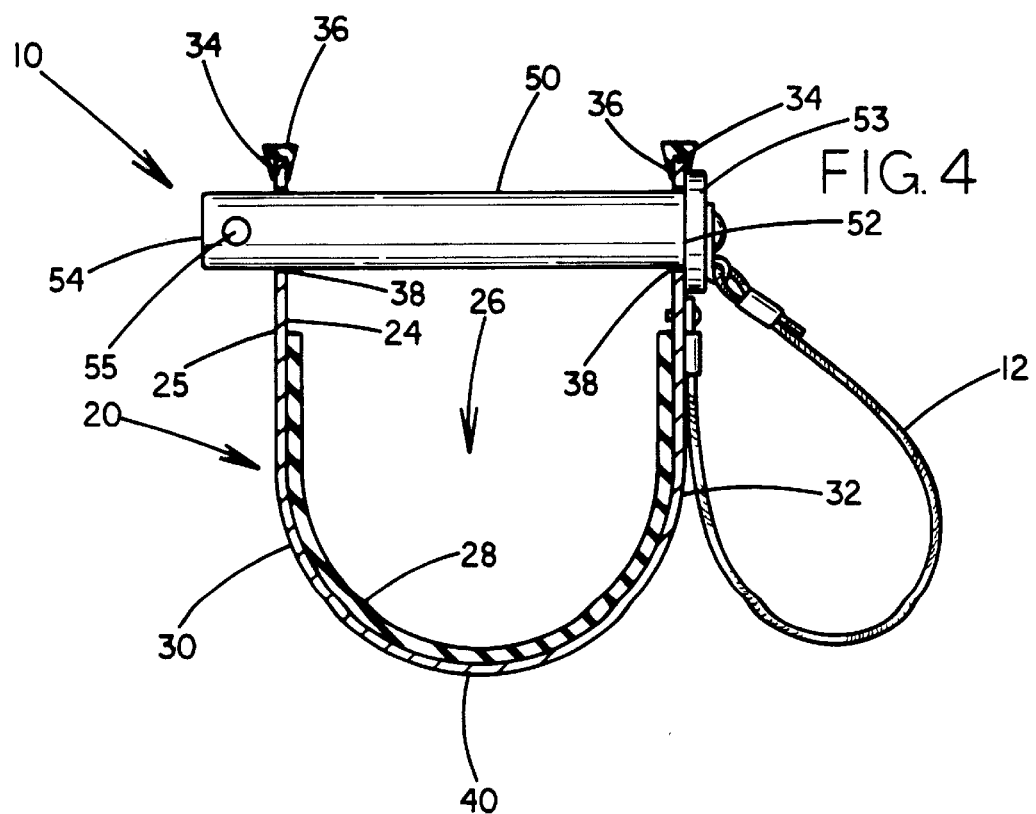

ANTI-THEFT DEVICE

BACKGROUND OF THE INVENTION

1. Field of the Invention

The present invention relates to anti-theft devices for a fluidic, or hydraulic, piston-cylinder actuator and more particularly pertains to a new anti-theft device for locking a telescopic fluidic piston-cylinder actuator in an extended piston position.

2. Description of the Prior Art

The use of anti-theft devices for a fluidic, or hydraulic, piston-cylinder actuator is known in the prior art. More specifically, anti-theft devices for a fluidic, or hydraulic, piston-cylinder actuator heretofore devised and utilized are known to consist basically of familiar, expected and obvious structural configurations, notwithstanding the myriad of designs encompassed by the crowded prior art which have been developed for the fulfillment of countless objectives and requirements.

Known prior art anti-theft devices for a fluidic, or hydraulic, piston-cylinder actuator include U.S. Pat. No. 4,529,215; U.S. Pat. No. 4,360,074; U.S. Pat. No. 4,417,644; U.S. Pat. No. 4,852,680; U.S. Pat. No. 5,441,124; and U.S. Pat. No. Des. 281,199.

While these devices fulfill their respective, particular objectives and requirements, the aforementioned patents do not disclose a new anti-theft device. The inventive device includes an elongate strut wall member having an arcuate wall portion with a pair of side wall portions. The side wall portions are spaced apart to define an elongate channel extending between the first and second ends of the strut wall member. The channel is designed for receiving the extended piston portion of a piston-cylinder actuator therein. Each side wall portion has an aperture extending through each of them. The distal end of an elongate locking pin is insertable through the apertures of the side wall portions such that the locking pin is extendible between the side wall portions across the channel of the strut wall member. The locking pin has a locking bore positioned towards its distal end for extending a shank portion of a lock therethrough to hold the extended piston portion of a piston-cylinder actuator within the channel when the locking pin is extended through the apertures of the side wall portions. One end of an elongate flexible member is coupled to one of the side wall portions while the other end of the flexible member is coupled to the proximal end of the locking pin.

In these respects, the anti-theft device according to the present invention substantially departs from the conventional concepts and designs of the prior art, and in so doing provides an apparatus primarily developed for the purpose of locking a telescopic fluidic piston-cylinder actuator in an extended piston position.

SUMMARY OF THE INVENTION

In view of the foregoing disadvantages inherent in the known types of anti-theft devices for a fluidic, or hydraulic, piston-cylinder actuator now present in the prior art, the present invention provides a new anti-theft device construction wherein the same can be utilized for locking a telescopic fluidic piston-cylinder actuator in an extended piston position.

The general purpose of the present invention, which will be described subsequently in greater detail, is to provide a new anti-theft device apparatus and method which has many of the advantages of the anti-theft devices for a fluidic, or hydraulic, piston-cylinder actuator mentioned heretofore and many novel features that result in a new anti-theft device which is not anticipated, rendered obvious, suggested, or even implied by any of the prior art anti-theft devices for a fluidic, or hydraulic, piston-cylinder actuator, either alone or in any combination thereof.

To attain this, the present invention generally comprises an elongate strut wall member having an arcuate wall portion with a pair of side wall portions. The side wall portions are spaced apart to define an elongate channel extending between the first and second ends of the strut wall member. The channel is designed for receiving the extended piston portion of a piston-cylinder actuator therein. Each side wall portion has an aperture extending through each of them. The distal end of an elongate locking pin is insertable through the apertures of the side wall portions such that the locking pin is extendible between the side wall portions across the channel of the strut wall member. The locking pin has a locking bore positioned towards its distal end for extending a shank portion of a lock therethrough to hold the extended piston portion of a piston-cylinder actuator within the channel when the locking pin is extended through the apertures of the side wall portions. One end of an elongate flexible member is coupled to one of the side wall portions while the other end of the flexible member is coupled to the proximal end of the locking pin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft device apparatus and method which has many of the advantages of the anti-theft devices for a fluidic, or hydraulic, piston-cylinder actuator mentioned heretofore and many novel features that result in a new anti-theft device which is not anticipated, rendered obvious, suggested, or even implied by any of the prior art anti-theft devices for a fluidic, or hydraulic, piston-cylinder actuator, either alone or in any combination thereof.

It is another object of the present invention to provide a new anti-theft device which may be easily and efficiently manufactured and marketed.

It is a further object of the present invention to provide a new anti-theft device which is of a durable and reliable construction.

An even further object of the present invention is to provide a new anti-theft device which is susceptible of a low cost of manufacture with regard to both materials and labor, and which accordingly is then susceptible of low prices of sale to the consuming public, thereby making such anti-theft device economically available to the buying public.

Still yet another object of the present invention is to provide a new anti-theft device which provides in the apparatuses and methods of the prior art some of the advantages thereof, while simultaneously overcoming some of the disadvantages normally associated therewith.

Still another object of the present invention is to provide a new anti-theft device for locking a telescopic fluidic piston-cylinder actuator in an extended piston position.

Yet another object of the present invention is to provide a new anti-theft device which includes an elongate strut wall member having an actuate wall portion with a pair of side wall portions. The side wall portions are spaced apart to define an elongate channel extending between the first and second ends of the strut wall member. The channel is designed for receiving the extended piston portion of a piston-cylinder actuator therein. Each side wall portion has an aperture extending through each of them. The distal end of an elongate locking pin is insertable through the apertures of the side wall portions such that the locking pin is extendible between the side wall portions across the channel of the strut wall member. The locking pin has a locking bore positioned towards its distal end for extending a shank portion of a lock therethrough to hold the extended piston portion of a piston-cylinder actuator within the channel when the locking pin is extended through the apertures of the side wall portions. One end of an elongate flexible member is coupled to one of the side wall portions while the other end of the flexible member is coupled to the proximal end of the locking pin.

Still yet another object of the present invention is to provide a new anti-theft device that helps deter thieves from stealing equipment having a telescopic fluidic piston-cylinder actuators.

Even still another object of the present invention is to provide a new anti-theft device that locks the piston portion of a telescopic fluidic piston-cylinder actuator in an extended portion and is padded to help avoid damaging the exposed piston portion.

These together with other objects of the invention, along with the various features of novelty which characterize the invention, are pointed out with particularity in the claims annexed to and forming a part of this disclosure. For a better understanding of the invention its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new anti-theft device according, to the present invention.

FIG. 2 is a schematic side view of the present invention mounted to the piston portion of an fluidic piston-cylinder actuator.

FIG. 3 is a schematic side view of the present invention.

FIG. 4 is a schematic cross-sectional view of the present invention.

DESCRIPTION OF THE PREFERRED EMBODIMENT

With reference now to the drawings, and in particular to FIGS. 1 through 4 thereof, a new anti-theft device embodying the principles and concepts of the present invention and generally designated by the reference numeral 10 will be described.

The anti-theft device 10 is designed for locking a telescopic fluidic piston-cylinder actuator 1. In particular, the anti-theft device 10 is designed for locking the retractably extendable piston portion 2 in an extended position from the cylinder portion 3, as shown in FIG. 2, to prevent retracting of the extended piston portion 2 back into the cylinder portion 3. As best illustrated in FIGS. 1 through 4, the anti-theft device 10 generally comprises an elongate strut wall member having an arcuate wall portion 40 with a pair of side wall portions 30,32. The side wall portions 30,32 are spaced apart to define an elongate channel 26 extending between the first and second ends 22,23 of the strut wall member 20. The channel 26 is designed for receiving the extended piston portion 2 of a piston-cylinder actuator 1 therein. Each side wall portion 30,32 has an aperture 38 extending through each of them. The distal end 54 of an elongate locking pin 50 is insertable through the apertures 38 of the side wall portions 30,32 such that the locking pin 50 is extendible between the side wall portions 30,32 across the channel 26 of the strut wall member 20. The locking pin 50 has a locking bore 55 positioned towards its distal end 54 for extending a shank portion 5 of a lock 4 therethrough to hold the extended piston portion 2 of a piston-cylinder actuator 1 within the channel 26 when the locking pin 50 is extended through the apertures 38 of the side wall portions 30,32. One end of an elongate flexible member 12 is coupled to one of the side wall portions 32 while the other end of the flexible member 12 is coupled to the proximal end 52 of the locking pin 50.

As shown in FIGS. 1 and 4, the elongate strut wall member 20 has an arcuate wall portion 40 and a pair of side wall portions 30,32. The side wall portions 30,32 are extended between the opposite first and second ends 22,23 of the strut wall member 20 with the terminal edges 34 of each side wall portion 30,32 being extended away from the arcuate wall portion 40. Ideally, as shown in FIG. 3, the side wall portions 30,32 are tapered towards the second end 23 of the strut wall member 20. Preferably, the terminal edges 38 of the side wall portions 30,32 and the first and second ends 22,23 of the strut wall member 20 have a padded layer 36 on them for helping protect the fluidic piston-cylinder actuator from damage when mounting the anti-theft device on the piston portion. Ideally, the padded layer 36 of the terminal edges 38 and the ends 22,23 of the strut wall member 20 are made of some sort of rubber.

As illustrated in FIG. 4, the side wall portions 30,32 are spaced apart from one another to define an elongate channel 26 that extends between the first and second ends 22,23 of the strut wall member 20. The channel 26 is designed for receiving the extended piston portion 2 of a piston-cylinder actuator 1 therein. Preferably, a padding layer 28 is provided on the inner surface 24 of the strut wall member 20 positioned along the arcuate wall portion 40 to protect the piston portion 2 from damage when inserted into the channel 26. Like the padded layer 36, the padding layer 28 preferably is made of rubber.

Ideally, a handle 14 is extended from the outer surface 25 of the strut wall member 20 for helping position the anti-theft device 10 on the piston portion 2. The handle 14 is preferably located on the arcuate wall portion 40 between the ends 22,23 of the strut wall member 20.

Through each side wall portion 30,32 is an aperture 38. The apertures 38 of the side wall portions 30,32 are generally coaxially aligned with one another and are preferably positioned towards the terminal edges 34 of the side wall portions 30,32. As shown in FIG. 4, the distal end 54 of a cylindrical elongate locking pin 50 is insertable through the apertures 38 such that the locking pin 50 is extendible between the side wall portions 30,32 across the channel 26 of the strut wall member 20. The locking pin 50 is designed for holding the extended piston portion 2 of a piston-cylinder actuator 1 within the channel 26 of the strut wall member 20 when the locking pin 50 is extended through the apertures 38 of the side wall portions 30,32. The locking pin 50 also has a locking bore 55 positioned towards its distal end 54 which is designed for extending a shackle 5 portion of a lock 4 therethrough for locking the locking pin 50 to the strut wall member 20. Ideally, the proximal end 52 of the locking pin has radial flange 53 to prevent insertion of the proximal end 52 through the apertures 38. The proximal end 52 of the locking pin 50 is coupled to one of the side wall portions 32 by an elongate flexible member 12 extending between them.

In use, the piston portion 2 of a telescopic fluidic piston-cylinder actuator 1 must first be extended from the cylinder portion 3. This permits insertion of the piston portion 2 into the channel 26 of said strut wall member 20. The distal end 54 of said locking pin 50 may then be inserted through said apertures 38 of said side wall portions 30,32 such that said locking pin 50 extends between said side wall portions 30,32 across said channel 20 to hold the piston portion 2 within the channel 26. The shank 5 of a lock 4 may be extended through the locking bore 55 to secure the locking pin 50 in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft device for a telescopic fluidic piston-cylinder actuator having a piston portion and a cylinder portion, the piston portion being retractably extendable from the cylinder portion between a retracted position and an extended position, said anti-theft device comprising:

an elongate strut wall member having opposite first and second ends, inner and outer surfaces, an arcuate wall portion, and a pair of side wall portions;

said side wall portions being extended between said first and second ends of said strut wall member;

said side portions being spaced apart to define an elongate channel extending between said first and second ends of said strut wall member, said channel being for receiving the extended piston portion of a piston-cylinder actuator therein, said side wall portions each heaving a terminal edge extending between said first and second ends of said strut wall member;

said terminal edges of said side wall portions having beveled first and second end regions and a middle portion interposed between said first and second end regions of the respective terminal edge;

said first end regions of said terminal edges being positioned adjacent said first end of said strut wall member;

said second end regions of said terminal edges being positioned adjacent said second end of said structure wall member;

said first and second end regions of each terminal edge being extended at obtuse angles to said middle region of the respective terminal edge, said obtuse angle of each second end region with respect to the associated middle region of the respective terminal edge being greater than said obtuse angle of the first end region of the respective terminal edge;

said first end regions of said terminal edges being extended at obtuse angles to said first end of said strut wall;

said second end regions of said terminal edges being extended at obtuse angles to said second end of said strut wall;

each said side wall portions having an aperture extending therethrough, said apertures of said side wall portion being generally coaxially aligned, said apertures being positioned towards said terminal edges of said side wall portions;

an elongate locking pin having opposing proximal and distal ends, and a locking bore extending therethrough, said locking bore being positioned towards said distal end, said distal end being insertable through said apertures of said side wall portions such that said locking pin is extendible between said side wall portions across said channel of said strut wall member, said locking bore being for extending a portion of a lock therethrough, said locking pin being for holding the extended piston portion of a piston-cylinder actuator within said channel of said strut wall member when said locking pin is extended through said apertures of said side wall portions; and an elongate flexible member having opposing ends, one said end of said flexible member being coupled to one of said side wall portions, the other said end of said flexible member being coupled to said proximal end of said locking pin.

2. The anti-theft device of claim 1, wherein said side wall portions are tapered towards said second end of said strut wall member.

3. The anti-theft device of claim 1, wherein said terminal edges of said side wall portions and said first and second ends of said strut wall member have a padded layer thereon.

4. The anti-theft device of claim 3, wherein said padded layer of said terminal edges and said ends of said strut wall member comprises rubber.

5. The anti-theft device of claim 1, further comprising a padding layer being provided on said inner surface of said strut wall member, said padding layer being positioned on said actuate wall portion.

6. The anti-theft device of claim 5, wherein said padding layer comprises rubber.

7. The anti-theft device of claim 1, further comprising a handle being extended from said outer surface of said strut wall member, said handle being located on said arcuate wall portion, said handle being positioned between said first and second ends of said strut wall member, said handle having a generally rectangular U-shaped configuration comprising a spaced apart pair of arm portions and a connecting portion extending between said arm portions to connect said arm portions together each of said arm portions of said handle having an end opposite said connecting portion of said handle, said ends of said arm portions being coupled to said arcuate wall portion of said strut wall member.

8. An Anti-theft device for a telescopic fluidic piston-cylinder actuator having a piston portion and a cylinder portion, the piston portion being retractably extendable from the cylinder portion between a retracted position and an extended position said anti-theft device comprising:

an elongate strut wall member having opposite first and second ends, inner and outer surfaces, an arcuate wall portion, and a pair of said wall portions;

said side wall portions being extended between said first and second ends of said strut wall member, said side wall portions being tapered towards said second end of said strut wall member;

said side wall portions being spaced apart to define an elongate channel extending between said first and second ends of said strut wall member, said channel receiving the extended piston portion of a piston-cylinder actuator therein, said side wall portions each having a terminal edge extending between said first and second ends of said strut wall member;

said terminal edges of said side wall portions having beveled first and second end regions and a middle portion interposed between said first and second end regions of the respective terminal edge;

said first end regions of said terminal edges being positioned adjacent said first end of said strut wall member;

said second end regions of said terminal edges being positioned adjacent said second end of said structure wall member;

said first and second end regions of each terminal edge being extended at obtuse angles to said middle region of the respective terminal edge, said obtuse angle of each second end region with respect to the associated middle region of the respective terminal edge being greater than said obtuse angle of the first end region of the respective terminal edge;

said first end regions of said terminal edges being extended at obtuse angles to said first end of said strut wall;

said second end regions of said terminal edges being extended at obtuse angles is said second end of said strut wall;

said terminal edges of said side wall portions and said first and second ends of said strut wall member having a padded layer thereon;

a padding layer being provided on said inner surface of said strut wall member, said padding layer being positioned on said arcuate wall portion;

a handle being extended from said outer surface of said strut wall member, said handle being located on said arcuate wall portion, said handle being positioned between said first and second ends of said strut wall member;

said handle having a generally rectangular U-shaped configuration comprising a spaced apart pair of arm portions and a connection portion extending between said arm portions to connect said arm portions together;

each of said arm portions of said handle having an end opposite said connecting portion of said handle, said ends of said arm portions being coupled to said arcuate wall portion of said strut wall member;

each said side wall portions having an aperture extending therethrough, said apertures of said side wall portion being generally coaxially aligned, said apertures being positioned towards said terminal edges of said side wall portions;

an elongate locking pin having opposing proximal and distal ends, and a locking bore extending therethrough, said locking bore being positioned towards said distal end, said distal end being inserted through said apertures of said side wall portions such that said locking pin is extended between said side wall portions across said channel of said strut wall member, a lock having a bolt portion, said bolt portion of said lock being extended through said locking bore, said locking pin holding the extended piston portion of a piston-cylinder actuator in said channel of said strut wall member; and an elongate flexible member having opposing ends, one said end of said flexible member being coupled to one of said side wall portions, the other said end of said flexible member being coupled to said proximal end of said locking pin.

* * * * *